Figure 1:
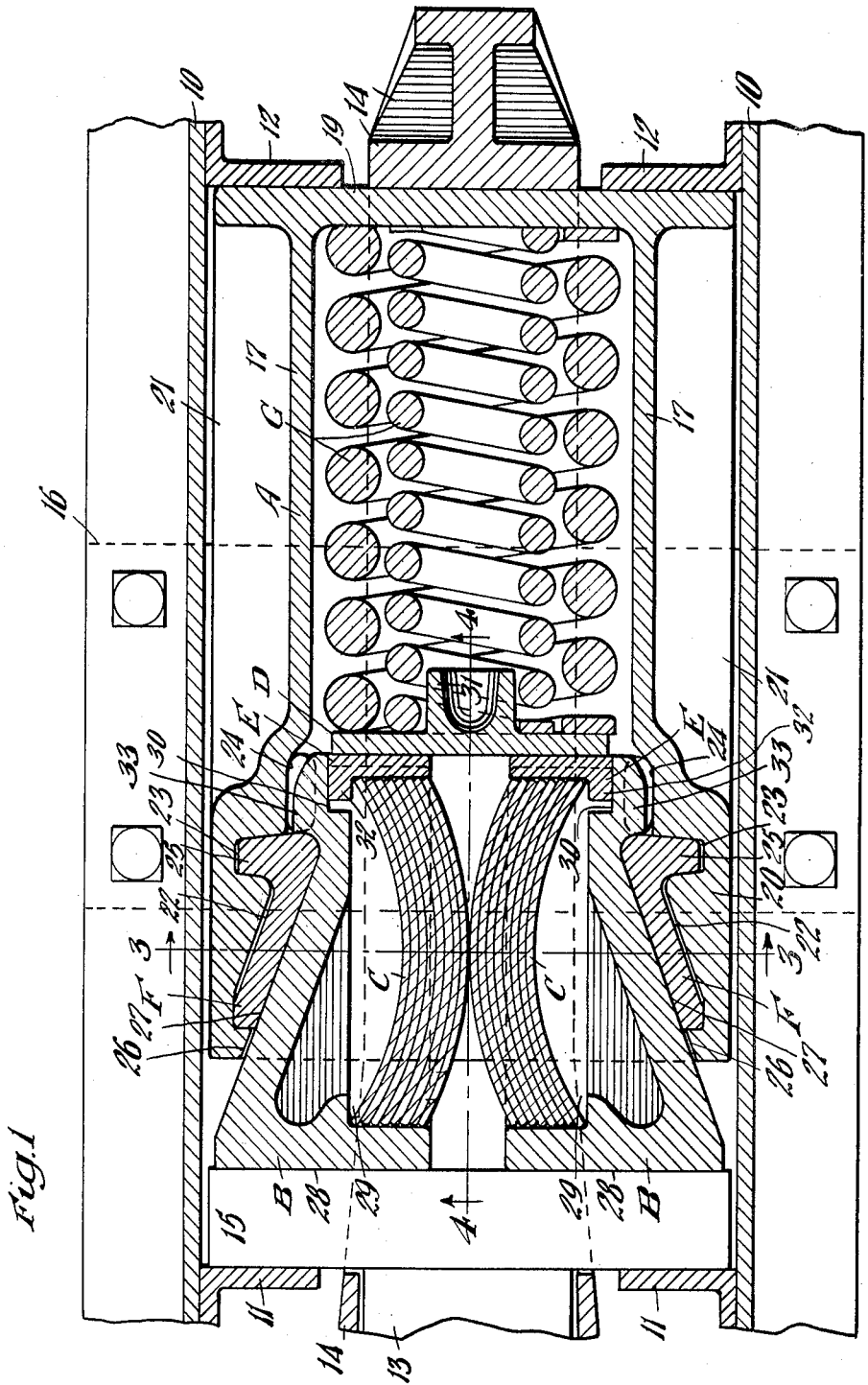

Feb. 27, 1934.   J. F. O'CONNOR   1,948,883
FRICTION SHOCK ABSORBING MECHANISM
Filed May 31, 1928    2 Sheets-Sheet 1

Witness
Wm. Geiger

Inventor
John F. O'Connor
By Joseph Harris
His Atty.

Feb. 27, 1934.   J. F. O'CONNOR   1,948,883
FRICTION SHOCK ABSORBING MECHANISM
Filed May 31, 1928   2 Sheets-Sheet 2
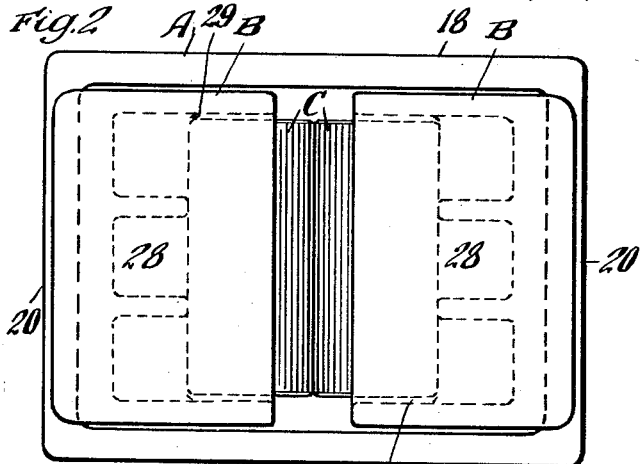
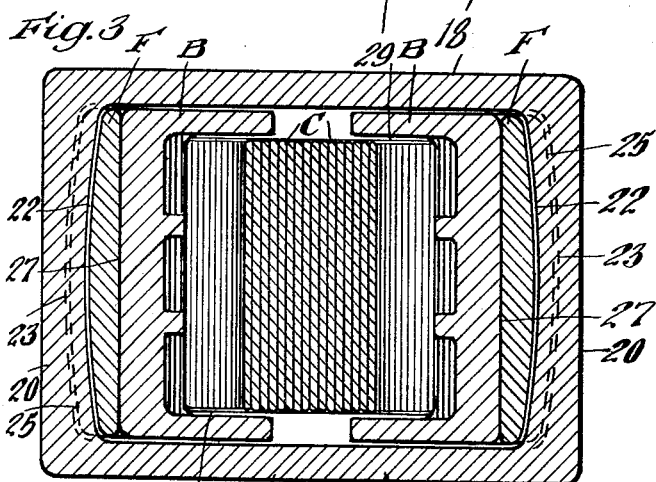
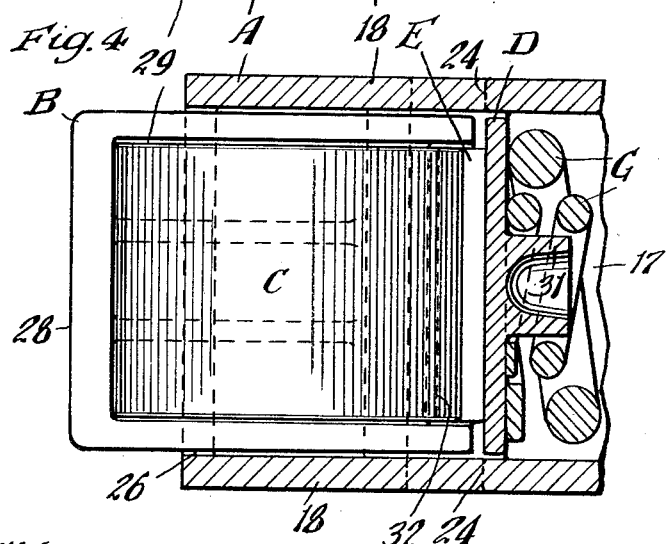
Witness
Wm. Geiger
Inventor
John F O'Connor
By Joseph Harris
His Atty.

Patented Feb. 27, 1934

1,948,883

UNITED STATES PATENT OFFICE 1,948,883

FRICTION SHOCK ABSORBING MECHANISM

John F. O'Connor, Chicago, Ill., assignor, by mesne assignments, of one-half to W. H. Miner, Inc., a corporation of Delaware, and one-half to Cardwell Westinghouse Company, a corporation of Delaware Application May 31, 1928. Serial No. 281,769

2 Claims. (Cl. 213—30)

This invention relates to improvements in friction shock absorbing mechanisms.

One object of the invention is to provide a friction shock absorbing mechanism of high capacity, so designed as to assure release, including a casing provided with inwardly converging, opposed wedge friction faces, a pair of friction wedge shoes cooperating with the friction faces, the shoes being yieldingly forced apart by spring means interposed therebetween; and a main spring resistance opposing inward movement of the shoes, wherein the spring means comprises a plurality of longitudinally disposed curved spring plates arranged in groups, adapted to be flexed upon relative lateral approach of the shoes, the shoes being provided with pockets adapted to accommodate the groups of spring plates, the pockets having front end walls adapted to directly engage the front ends of the plates, the inner ends of the spring plates bearing on follower means cooperating with the main spring resistance, the follower means including hardened steel wear members in engagement with the inner ends of the plates, thereby preventing damage to the spring follower.

A further object of the invention is to provide a friction shock absorbing mechanism of the character indicated, wherein the parts are so designed that the friction elements, groups of spring plates, spring follower and wear plate members may be readily assembled with and removed from the casing.

Other and further objects of the invention will more clearly appear from the description and claims hereinafter following.

In the drawings, forming a part of this specification, Figure 1 is a horizontal, longitudinal, sectional view of the underframe structure of a railway car at one end thereof, illustrating my improvements in connection therewith. Figure 2 is a front end elevational view of the shock absorbing mechanism proper in which my improvements are embodied. Figure 3 is a transverse, vertical, sectional view, corresponding substantially to the line 3—3 of Figure 1. And Figure 4 is a longitudinal, vertical, sectional view of the forward end portion of the mechanism illustrated in Figure 1 and corresponding substantially to the line 4—4 of said figure, the main follower being omitted in Figure 4.

In said drawings, 10—10 indicate the usual channel-shaped center or draft sills of the railway car underframe, to the inner sides of which are secured front stop lugs 11—11 and rear stop lugs 12—12. The inner end portion of the coupler shank is designated by 13. The coupler shank is secured to the usual yoke member 14 which encloses the shock absorbing mechanism proper and a front main follower 15. The yoke and the parts therewithin are supported in operative position by a detachable saddle plate 16 secured to the bottom flanges of the draft sills 10.

My improved shock absorbing mechanism proper comprises, broadly, a casing A; two friction wedge shoes B—B; two groups of spring plates C—C; a spring follower D; wear plate members E—E; a pair of liners F—F; and a main spring resistance G.

The casing A is in the form of a casting of substantially rectangular cross section, having longitudinally disposed, vertical, spaced side walls 17—17, horizontally disposed, longitudinally extending, spaced top and bottom walls 18—18, and a vertically disposed rear end wall 19. As shown in the drawings, the end wall 19 projects laterally beyond the main portions of the side walls 17 of the casing A and cooperates with the stop lugs 12 in the manner of the usual rear follower. As clearly shown in Figure 1, the side walls at the front end of the casing A are offset laterally with respect to the main portion of the walls 17 and are thickened, as indicated at 20. Between the offset thickened wall portions 20 and the end wall 19, the casing is reinforced by horizontally disposed, longitudinally extending flanges 21—21. In addition to reinforcing the casing A, the flanges 21 also act as guide members cooperating with the inner sides of the draft sills to properly center the casing between the sills. The thickened wall portions of the casing are cut away on the inner sides, as indicated at 22, to provide seats or pockets to receive the liners F. As most clearly illustrated in Figure 1, each pocket or seat 22 comprises an elongated front section having the inner wall thereof inclined with respect to the axis of the mechanism, said inner walls of the opposed pockets of the two side walls converging inwardly, as shown.

Rearwardly of the inclined wall, each pocket is provided with an outwardly offset section 23, having converging front and rear vertical walls for a purpose hereinafter set forth.

The top and bottom walls of the casing, rearwardly of the pockets 22 in the side walls, are provided with aligned vertical openings 24—24, adapted to receive guide key members which are employed in the operation of removing the friction wedge means from the casing, as hereinafter more clearly pointed out.

The liners F—F, which are disposed at opposite sides of the casing, are of similar design. Each liner comprises a relatively heavy plate-like body section provided with a lateral outward extension 25 at the rear end thereof. As clearly shown in Figure 1, the lateral extension 25 is tapered so as to fit the corresponding recess 23 and have wedging engagement with the converging front and rear walls of the same. The inner and outer surfaces of the plate-like body portions of each liner F are in substantial parallel relation with the inclined inner wall of the corresponding pocket or recess 22. As shown, the front edge of each liner engages the vertical front end wall of the pocket and the side wall of the casing is cut away outwardly of the liner, as indicated at 26, on an inclination corresponding substantially to the inclination of the inner surface of the liner, but offset slightly outwardly therefrom. Each liner F presents a flat inner friction wedge face 27, adapted to cooperate with the corresponding wedge friction shoe B.

The rear end sections of the liners F project laterally beyond the inner face of the corresponding side wall section, so that the liner presents a vertical rear end stop shoulder which serves as a retaining shoulder for the corresponding friction shoe B, as hereinafter more clearly pointed out.

The two friction shoes B are disposed at opposite sides of the casing, and have inclined outer surfaces which cooperate with the friction wedge surfaces of the liners. The two shoes B are of similar design, each having a flat front end face 28 bearing directly on the inner surface of the main follower 15. The faces 28 of the shoes B have sliding frictional engagement with the inner surface of the follower 15 during the compression of the mechanism. On the inner side, each shoe B is recessed, as indicated at 29, to provide a pocket to accommodate the group of spring plates C at the corresponding side of the mechanism. As shown, the pocket 29 of each shoe is open at the rear end and the inner wall of said pocket is cut away at the rear end of the shoe, as indicated at 30, to provide a guideway to slidingly accommodate the outer section of the corresponding wear plate E. As will be clear, upon reference to Figures 3 and 4, the top and bottom walls and the front end wall defining each pocket embrace the corresponding group of spring plates C, the plates having their front end edges bearing directly on the inner surface of the end wall of the pocket. At the rear ends, the shoes are provided with laterally offset portions 33, which are adapted to engage in back of the liners F to limit outward movement of the shoes and maintain the parts of the mechanism assembled.

The spring plates C, as hereinbefore mentioned are arranged in two groups. As shown, each group is preferably composed of eight such plates. The plates C are curved in a longitudinal direction and the two groups have the convex adjacent surfaces of the inner plates thereof in bearing engagement.

The spring follower D is in the form of a rectangular plate having a central, rearwardly projecting boss 31. The spring follower bears directly on the main spring resistance G, which, as shown, is composed of two coils, a light inner coil and a heavier outer coil. The spring resistance has the opposite ends thereof bearing on the spring follower and the inner end wall 19 of the casing A. The two wear plates E are interposed between the inner ends of the two groups of spring plates C and the spring follower D. Each wear plate comprises a transversely disposed rectangular section, having a forwardly projecting right angular flange 32 at the outer end thereof. As shown, the flange 32 is of such a thickness that the inner face thereof registers with the inner wall of the pocket 29 of the corresponding friction wedge shoe B when the wear plate is arranged in operative relation with respect to the corresponding friction shoe and group of spring plates C. As will be evident, the wear plates E protect the spring follower from damage by gouging or scoring action of the inner ends of the spring plates. Each wear plate E is preferably made of hardened tempered steel so as to assure long life of the same.

The parts of my improved shock absorbing mechanism are assembled in the usual manner by first inserting the liners and then assembling the remaining elements within the casing. In removing the parts of the friction system from the casing, the entire mechanism is first compressed so as to force the friction wedge shoes B inwardly of the casing to an extent that the offset inner end sections will be disposed inwardly beyond the aligned vertical openings 24 of the casing. When the parts are in this position, keys in the form of vertical bars are inserted through the openings 24. As will be evident, the bars form guide walls which are continuous with the walls 17 of the casing and are also flush with the inner ends of the liners F. The mechanism is then permitted to expand and the spring resistance G will cause the ejection of the friction wedge shoes B and the parts carried thereby, inasmuch as the lateral enlargements at the inner ends of the shoes will ride over the keys which extend through the openings 24 of the casing and will not engage in back of the liners F. The removal of the spring follower and main springs is then a simple matter.

The operation of my improved shock absorbing mechanism, assuming a compressing stroke, is as follows: the main follower 15 and the casing A will be moved toward each other, thereby forcing the friction wedge shoes B inwardly of the casing A along the friction wedge faces of the liners F. Due to the inwardly converging relation of the inner faces of the liners, the shoes B will be forced to approach each other laterally during their inward movement, thereby compressing the groups of spring plates C.

As the spring plates C are laterally compressed the groups will be elongated, due to the straightening out of the plates, thereby forcing the spring follower D inwardly at a greater rate than the movement of the shoes, thus producing an additional compression of the main spring resistance G. The compression of the mechanism continues either until the actuating force is removed or inward movement of the follower 15 is limited by engagement with the front end of the casing A, whereupon the actuating force is transmitted directly through the casing which acts as a solid column load-transmitting member preventing the main springs from being unduly compressed.

During release, the expansive action of the main spring resistance forces the spring follower C outwardly, carrying the wear plate members E therewith, and the latter, through their bearing engagement with the spring plates C, force the same forwardly, carrying the friction shoes which are engaged by the front ends of the plates outwardly therewith until movement of the shoes is arrested by engagement of the enlargements 33 thereof with the inner ends of the liners F.

As shown in Figure 1, the parts are so proportioned that the front end edges of the angular extensions 32 of the wear plates will be normally spaced from the front end wall of the cut-away section 30 of the corresponding shoe B, so that the spring plates C will always be under yielding pressure imposed by the main spring resistance G which is normally under initial compression.

It will be evident that the spring plates C are thus held against rattling within the pockets of the shoes B, thereby preventing digging in of the end edges of the plates and greatly reducing the wear of the inner faces of the front end walls of the pockets 29 of the shoes B and the front faces of the hardened steel wear plates E. It is further pointed out that in the compression action of the mechanism, in addition to the resistance offered by the main spring element G, the groups of spring plates C and the cooperating friction surfaces of the shoes B and liners F, additional frictional resistance is provided, due to the lateral sliding movement of the shoes B on the inner side of the main follower 15.

While I have herein shown and described what I now consider the preferred manner of carrying out my invention, the same is merely illustrative and I contemplate all changes and modifications which come within the scope of the claims appended hereto.

I claim:

1. In a friction shock absorbing mechanism, the combination with a casing having opposed, interior, inwardly converging wedge faces at one end thereof; of a pair of wedge shoes cooperating with the wedge faces of the casing, each of the shoes being provided with an interior pocket on the inner side thereof; transversely disposed wear plate members, longitudinally movable in the inner ends of said pockets; spring means including a group of spring plates within each pocket, having the opposite ends thereof bearing on the front end wall of the pocket and the corresponding wear plate member, said plates being curved longitudinally and said two groups being interposed between the two shoes and yieldingly resisting relative approach of the same, said plates being flexed by relative approach of the shoes, thereby effecting elongation of said spring means and movement of said wear plates lengthwise of the shoes; a main spring resistance within the casing and a spring follower interposed between the main spring resistance and the wear plates.

2. In a friction shock absorbing mechanism, the combination with a casing; of opposed liners anchored to the inner sides of the side walls of the casing, said liners projecting laterally beyond the inner faces of the side walls; friction members cooperating with the liners and having shouldered engagement with the inner ends of the same; spring resistance means opposing lateral approach of said friction members; a main spring resistance within the casing, opposing inward movement of the friction members, said casing being provided with aligned openings rearwardly of said liners, adapted to accommodate vertically disposed keys, the keys forming guides to prevent shouldered engagement between the friction members and liners during removal of the friction members from the casing.

JOHN F. O'CONNOR.